May 19, 1931.  H. M. LUDWICK  1,806,545
LUBRICATOR
Filed June 26, 1928  3 Sheets-Sheet 1
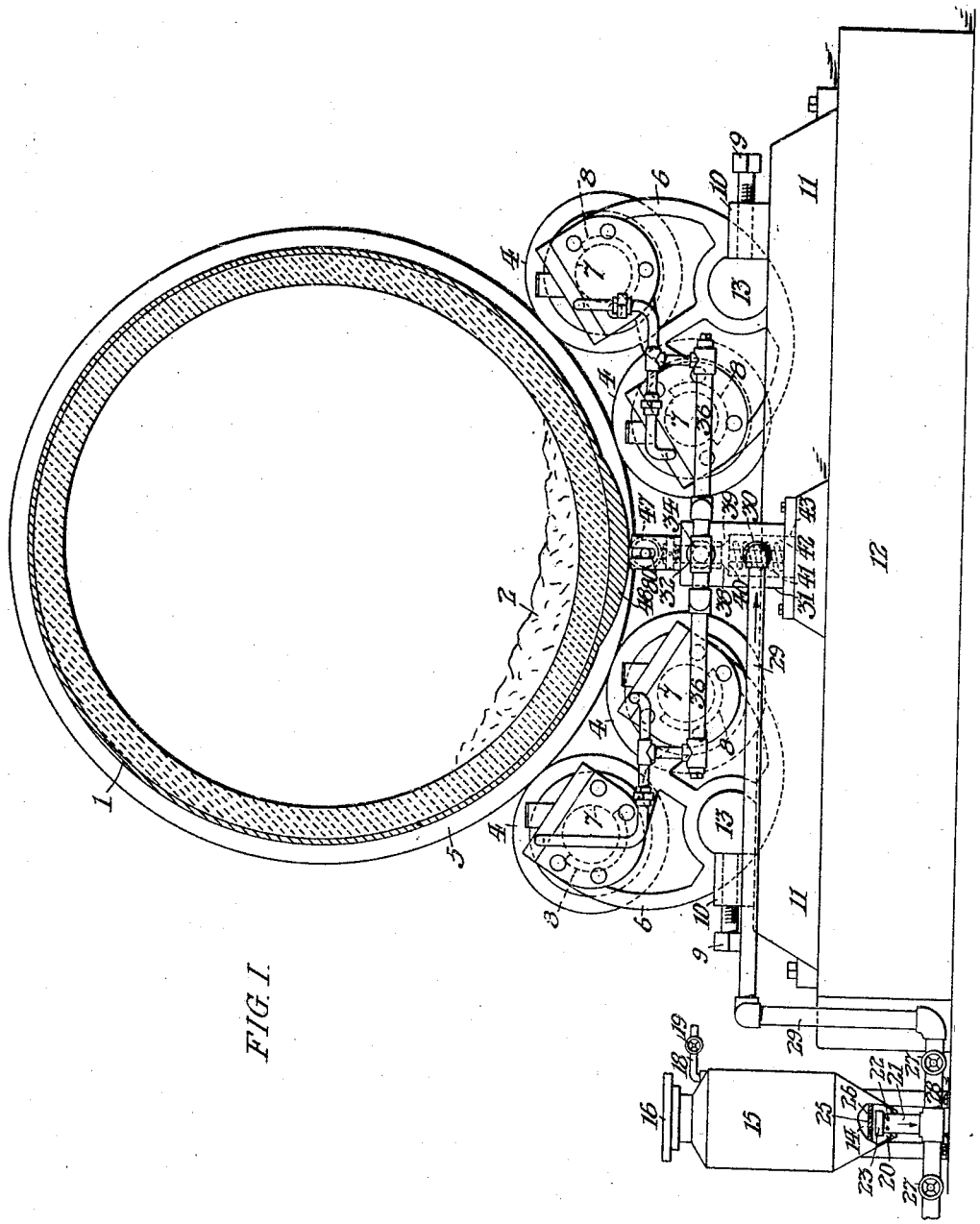
FIG. I.
INVENTOR:
HARLAN M. LUDWICK,

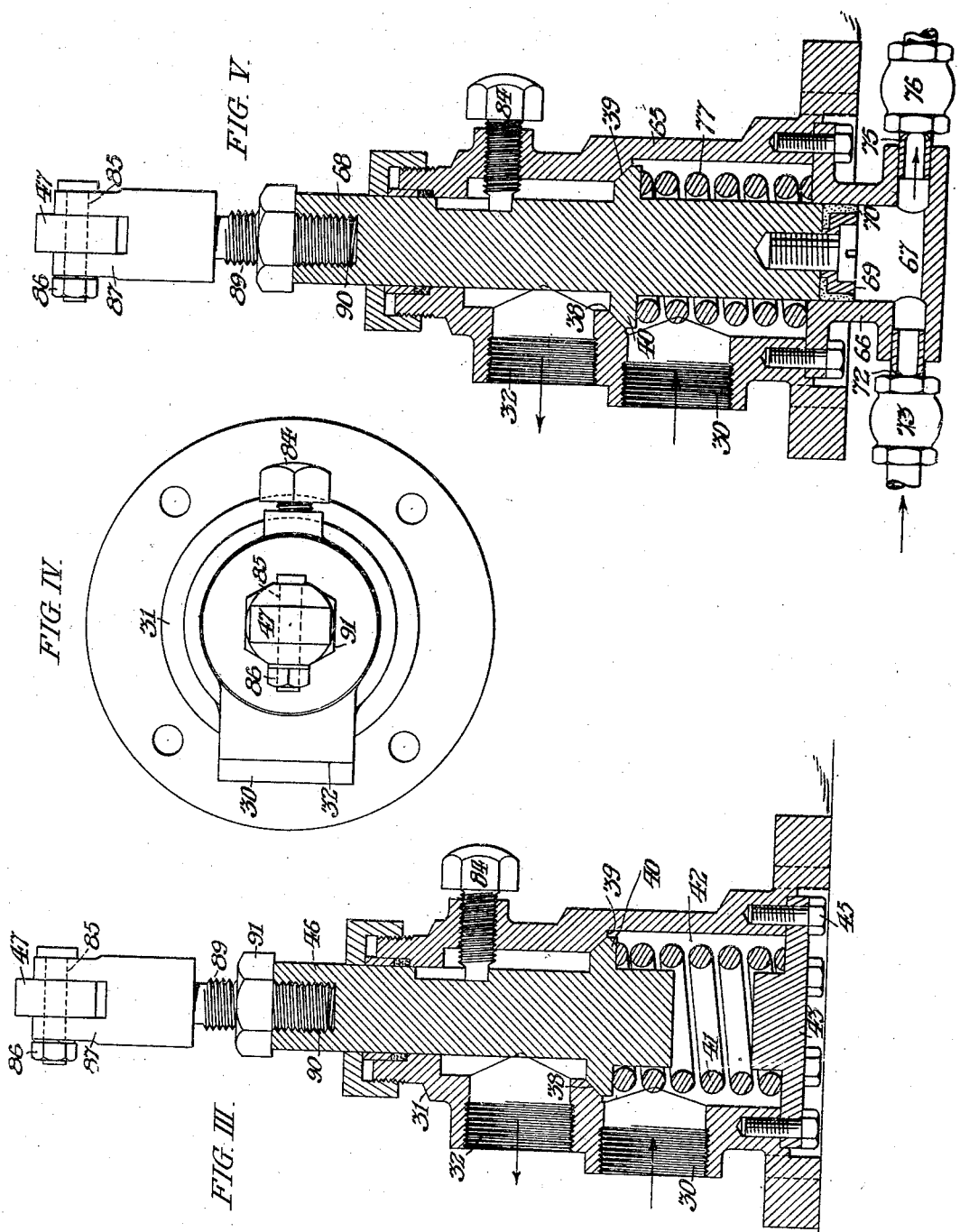

May 19, 1931.   H. M. LUDWICK   1,806,545
LUBRICATOR
Filed June 26, 1928   3 Sheets-Sheet 3
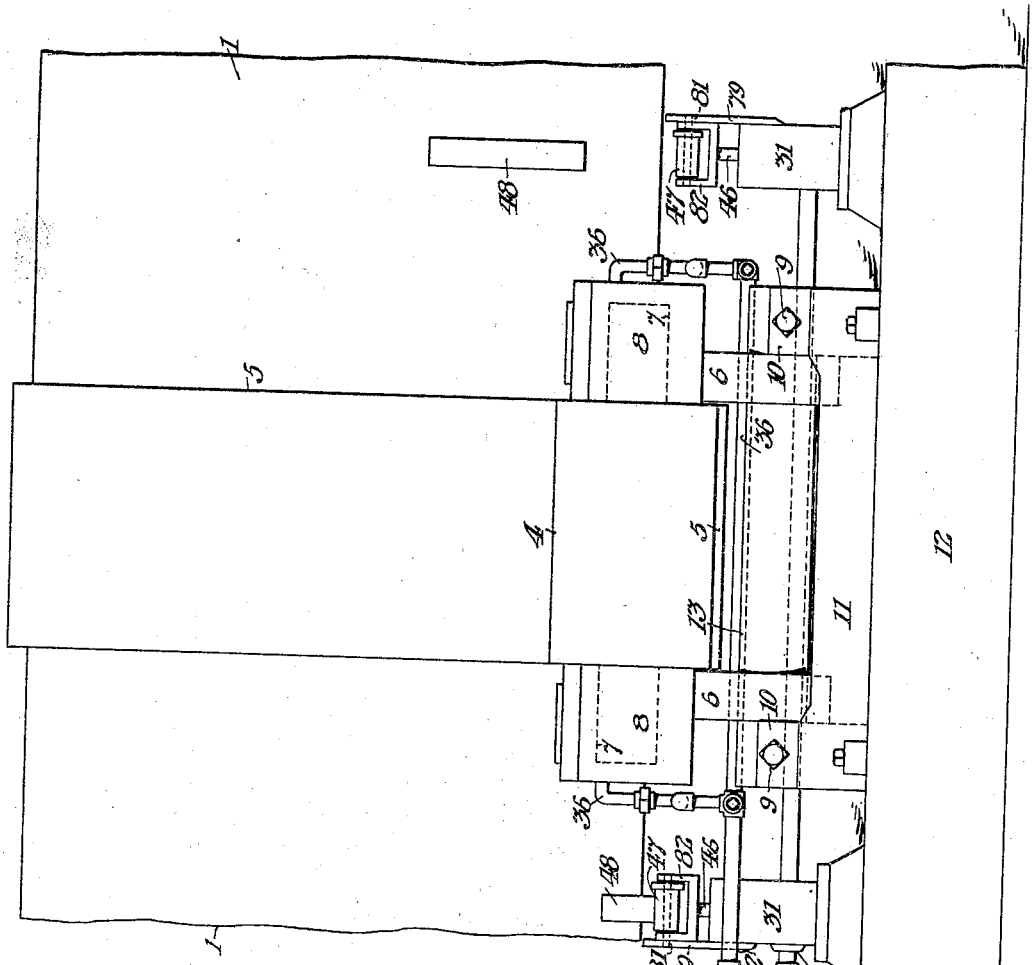
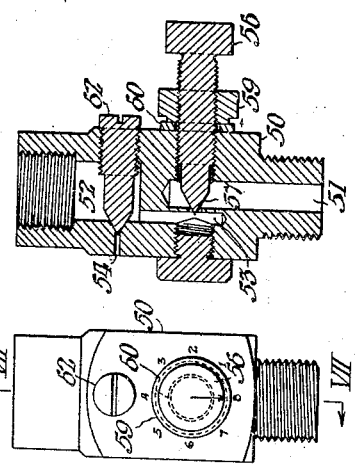
INVENTOR:
HARLAN M. LUDWICK,

Patented May 19, 1931

1,806,545

UNITED STATES PATENT OFFICE

HARLAN M. LUDWICK, OF PARKESBURG, PENNSYLVANIA, ASSIGNOR TO KEYSTONE LUBRICATING COMPANY, OF PHILADELPHIA, PENNSYLVANIA, A CORPORATION OF PENNSYLVANIA

LUBRICATOR

Application filed June 26, 1928. Serial No. 288,318.

My invention relates to apparatus for dispensing lubricant, such as heavy grease, to the bearings of heavy machinery such as rotary cement kilns, and it is the object and effect thereof to forcibly feed the lubricant to such bearings intermittently as a consequence of the operation of the mechanism of the machinery which is to be lubricated.

In the embodiment of my invention hereinafter described, the intermittent feed of the lubricant is effected by rotation of a cam carried by the kiln which, at each rotation, thrusts a reciprocatory plunger in a casing to alternately permit and prevent the passage of lubricant thru a port in said casing, to which the lubricant is supplied under pressure from a container adapted to hold the lubricant and compressed air in cooperative relation.

My invention includes the various novel features of construction and arrangement hereinafter more definitely specified.

In said drawings; Fig. I is a transverse sectional view of a rotary cement kiln showing, in elevation, one group of roller bearings for said kiln with an embodiment of my invention applied thereto.

Fig. II is a fragmentary side elevation of the structure shown in Fig. I.

Fig. III is a vertical sectional view of a modified form of the plunger casing and its appurtenances indicated in Fig. I and II; wherein the thrust of the plunger by the cam merely permits the flow of lubricant thru the casing.

Fig. IV is a plan view of the structure shown in Fig. III.

Fig. V is a vertical sectional view, similar to Fig. III, but showing a modified form of my invention wherein the thrust of the plunger by the cam not only permits, but compels, the flow of lubricant thru the casing.

Fig. VI is a front elevation of a device adapted to adjustably determine the volume and manifest the flow of lubricant thru a port; such devices being included in each of the branch lubricant feed pipes leading to the respective bearings indicated in Figs. I and II.

Fig. VII is a longitudinal sectional view of the device shown in Fig. VI.

Referring to Figs. I and II; 1 indicates a fragment of a rotary cement kiln, which is a cylinder about sixty feet in length, in which Portland cement 2 is calcined by flames and products of combustion escaping longitudinally thru the kiln while the latter is rotated to continually tumble the cement and gradually progress it lengthwise from end to end of said cylinder. Such a kiln is mounted to rotate upon a series of groups of roller bearings disposed at intervals thruout its length; of which but one group is shown. Each such group includes four rollers 4 in registry with a bearing band 5 on the cylinder 1. Said rollers 4 are mounted in pairs in housings 6, in which their opposite end trunnions 7 are journaled in individual bearings 8 and are held in proper relation with said cylinder 1 by the set screws 9 which are adjustable thru the abutments 10 on the base frame 11 upon the foundation bed 12, and bear against the shafts 13 on which said housings 6 are journaled.

The lubricant 14 for all of said bearings for the kiln is dispensed from the single container 15, indicated in Fig. I, which is conveniently a sheet metal tank having a removable closure 16 at the top thereof, thru which the lubricant may be introduced, and by which said tank is normally hermetically sealed. Said container 15 is supplied with compressed air thru the conduit 18 under control of the valve 19 so as to continually subject the grease 14 to pneumatic pressure tending to discharge it from said container thru the outlet 20. I prefer to provide said outlet 20 with a tube 21 extending within said container 15 and having outlet openings 22 in the vertical sides thereof, beneath its upper end cap 23. In order to insure that the mass of grease 14 shall be uniformly lowered and discharged from said container 15; I prefer to provide the latter with the diaphragm 25 which has a series of perforations 26 thruout its area at least equal to the effective area of the outlet 20. The outlet conduit 20 may be an ordinary wrought iron pipe provided with suitable valves 27 which, of course, are opened when it is desired to dispense the grease 14 from said container 15.

The conduit 28 shown in Fig. I, in communication with said container outlet 20, has the branch 29 leading to the lubricant inlet 30 in the casing 31 which has the lubricant outlet 32 with the conduit 34 having the several branches 36 respectively leading to the individual bearings 8 of the trunnions 7 of the rollers 4. Said casing 31 has the port 38 between said lubricant inlet 30 and the outlet 32, surrounded by the conical seat 39 for the valve 40 which is normally pressed to closed position by the helical spring 41 which is mounted in the inlet chamber 42 of said casing 31 with its upper end pressing against said valve and its lower end supported by the abutment closure 43 of said casing 31, which is removably connected with said casing, conveniently by bolts 45.

In the forms of my invention shown in Figs. I and III: the valve 40 is directly connected with a reciprocatory plunger 46 in coaxial relation therewith; which plunger carries, at its upper end, a roller 47 for contact with the cam 48 carried upon the circumference of the kiln 1, so that, during each revolution of said kiln, said plunger 46 is thrust downwardly to momentarily open said port 38 and permit the flow of lubricant 14 thru said casing 31 to said roller bearings 8, only while the cam 48 is actuating said plunger 46. During the remainder of the rotary movement of said cam 48, passage of lubricant thru the casing 31 is prevented by the closure of said valve 40 by said spring 41.

Altho the lubricant feeding operation aforesaid is intermittent: the effect thereof is to maintain each of said bearings 8 continually packed with grease under such pressure as to adequately lubricate each of the trunnions 7. In order to distribute the stress upon said cylinder and the mechanism which drives it, thruout the turning movement thereof; I find it convenient to so locate the individual cams 48 in the series carried by each kiln 1, that no two of them are simultaneously operative: but they are successively operated at uniform intervals thruout each revolution of said kiln.

As it is practically impossible to so predetermine the respective effective areas of the branch lubricant conduits 36 as to properly limit the supply of lubricant therethru to the respective bearings 8, regardless of the different distances of said bearings from the plunger casing 31; I find it convenient to provide each of said branches 36 with means adapted to determine the volume of lubricant dispensed thereto. Moreover, in order to enable the operator to determine whether the lubricant is actually flowing to the respective bearing 8; I prefer to provide such regulating devices as are shown in Figs. VI and VII which are adapted to not only variably determine the volume, but manifest the flow, of lubricant therethru, locally with respect to each of said bearings 8.

Referring to Figs. VI and VII; 50 is a casing having the lubricant inlet 51 and outlet 52 and the port 53 of fixed area between them and the tell-tale vent 54 upon one side of said port, and preferably upon the outlet side thereof. The needle valve screw 56 which is in threaded engagement with said casing 50 and has the conical point 57 adapted to enter said port 53, is axially adjustable to vary the effective area of said port, and thereby determine the volume of lubricant dispensed thru said casing 50. Said screw 56 has the lock nut 59 and the spring lock washer 60 whereby said screw 56 may be secured against accidental displacement when adjusted. One of said needle valves is inserted in the grease line at each bearing to be lubricated and adjusted to determine the precise amount of grease delivered thereto: the "tell-tale" vent 54 being on the side of the needle valve screw 56 next to the bearing. Said tell-tale vent 54 is normally closed by the screw plug 62 which may be retracted to open said vent to manifest whether lubricant is flowing thru said casing 50 or not. If it is flowing, some of it will come thru said vent when opened. If none of the lubricant comes thru the opened vent, the operator knows that there is some obstruction preventiong the flow of lubricant thru said casing 50.

I am aware that it is old to provide lubricating devices including what are termed "sight feeds" to visibly manifest whether lubricant is flowing thru such a feed or not. However, such devices of which I am aware are not adapted for such a system of lubrication as herein contemplated which, altho intermittent, in the sense that the flow is alternately permitted and stopped, is not intermittent in the sense that the stream of lubricant is interrupted so that separate portions thereof may be seen to move, like the drops of oil thru a sight lubricator. On the contrary, under normal conditions, the stream of lubricant is continuous from the supply container thruout the conduit to each bearing, and even if the wall of the conduit were transparent, it would not visually manifest any movement of the lubricator therein. Incidentally, my tell-tale device does not disclose to the operator the stream of lubricant flowing to the bearing, but merely permits a portion thereof to be permanently ejected from the apparatus as a manifestation of the fact that a stream of lubricant is under pressure within the casing 50, on its way to the bearing 8 with which said casing is connected, as above contemplated. The form of apparatus shown in Fig. V is advantageous where it is desirable to furnish a bearing with lubricant under higher pressure than the pressure of the lubricant simultaneously dispensed to the other bearings thru the outlet 32 of said casing 65.

In the apparatus above described, the thrust of the plunger 46 by the cam 48 merely permits the flow of lubricant 14 to the bearings, without compelling such flow; the flow being compelled by the pneumatic pressure in the container 15. However, the thrust of said cam upon a reciprocatory plunger may be used to not only permit, but compel, the flow of the lubricant. For instance, in the form of my invention shown in Fig. V; the casing 65, which is substituted for the casing 31, has the abutment closure 66 substituted for the closure 43 shown in Fig. III; which closure 66 has the cylindrical pump chamber 67 in alinement with the plunger 68 which is substituted for the plunger 46 aforesaid, but is longer, and has, at its lower end, the piston 69 provided with the cup leather 70 fitting in said pump chamber 67, and said pump chamber 67 has the lubricant inlet 72 provided with the check valve 73, and the outlet 75 provided with the check valve 76 so that, by upward movement of said plunger 68, under pressure of the spring 77, lubricant is drawn into said chamber 67 past the inlet check valve 73 while the check valve 76 is drawn shut, and downward thrust of said plunger 68 by a cam such as 48, closes the check valve 73 and opens the check valve 76 and not only permits, but compels, the lubricant in the chamber 67 to flow to the bearing.

In either form of my plunger device aforesaid, it is desirable to provide means to prevent rotation of the plunger in its casing, in order that the axis of the roller which cooperates with the cam shall be maintained parallel with the axis of the latter. In the form of my invention shown in Figs. I and II, such means includes the guide plate 79 which is rigidly connected with the casing 31 and has the slot 80 therein engaging the axial shaft 81 of said roller 47 which is journaled in the yoke 82 which is a part of the plunger 46. In the form of my invention shown in Fig. III; the plunger 46 is prevented from turning by the set screw 84 which is in screw threaded engagement with the plunger casing 31 and closely fits a flattened portion of said plunger; and the roller 47 is journaled on the shaft 85 which is a bolt held by the nut 86 in stationary position in the yoke 87 which has the screw threaded stem 89 which is rotatably and axially adjustable in a corresponding screw threaded socket 90 in the plunger 46, in which it is secured in adjusted position by the lock nut 91. It is to be understood that by axial adjustment of said stem in said plunger, the effective thrust of the cam 48 upon the roller 47, and consequent movement of the plunger 46, may be varied, to vary the extent of opening movement of the valve 40 and thus determine the volume of lubricant which is permitted to pass thru the casing 31 at each stroke of said cam and plunger.

In the form of my invention shown in Fig. V; the plunger 68 has its upper portion constructed and arranged like the plunger 46 shown in Fig. III, to carry the cam roller in axially adjustable relation therewith. However, in that form of my invention, axial adjustment of the screw threaded stem 89 varies the effective stroke of the cam 48 upon the plunger and thereby varies the quantity of the lubricant which is compelled to pass from said casing 65 at each such stroke.

Therefore, I do not desire to limit myself to the precise details of construction and arrangement or method of operation herein set forth, as it is obvious that various modifications may be made therein without departing from the essential features of my invention, as defined in the appended claims.

I claim:

1. In lubricating apparatus, means adapted to determine the volume and manifest the flow of lubricant dispensed thru a port, including a casing having a lubricant inlet and a lubricant outlet, and a port of fixed area between them, and a tell-tale vent upon one side of said port; axially adjustable screw means adapted to vary the effective area of said port, and thereby determine the volume of lubricant dispensed; and screw means normally closing said vent, but axially adjustable to open said vent to manifest the flow of lubricant therethru.

2. Lubricating apparatus as in claim 1, wherein the tell-tale vent is between said port and outlet.

In testimony whereof, I have hereunto signed my name at Philadelphia, Pennsylvania, this eighth day of June, 1928.

HARLAN M. LUDWICK.